No. 816,703. PATENTED APR. 3, 1906.
C. E. BEWLEY.
HOSE COUPLING.
APPLICATION FILED JUNE 9, 1904.
Fig. I
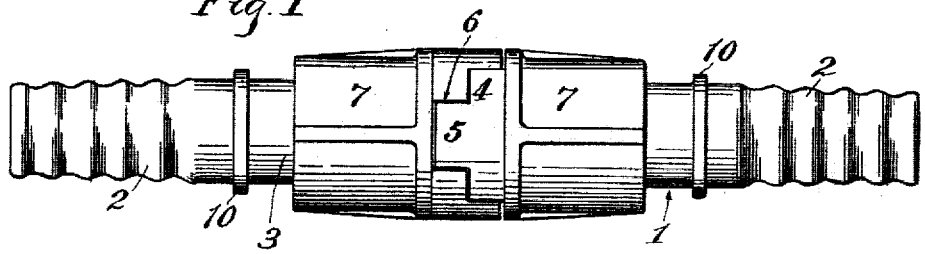
Fig. III
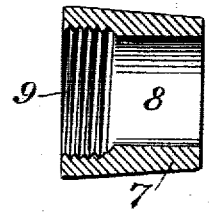
Fig. II
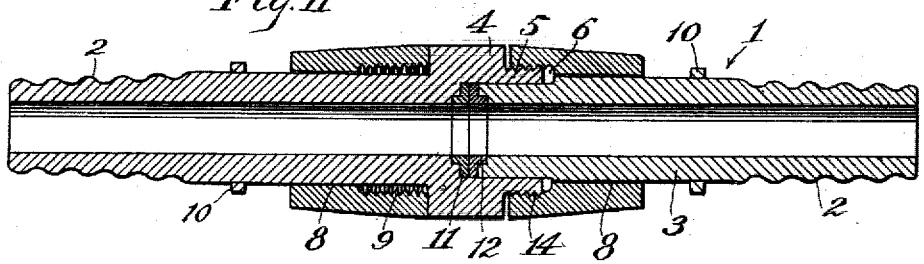
Fig. IV
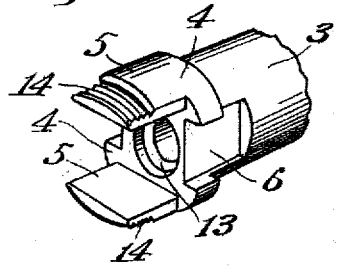
Witnesses:
C. C. Heolly
U. P. Knight
Inventor
Claude E. Bewley
by Townsend Bros
His attys

UNITED STATES PATENT OFFICE.

CLAUDE E. BEWLEY, OF LOS ANGELES, CALIFORNIA, ASSIGNOR OF ONE-HALF TO JOHN C. BEWLEY, OF LOS ANGELES, CALIFORNIA.

HOSE-COUPLING.

No. 816,703.   Specification of Letters Patent.   Patented April 3, 1906.

Application filed June 9, 1904. Serial No. 211,805.

*To all whom it may concern:*

Be it known that I, CLAUDE E. BEWLEY, a citizen of the United States, residing at Los Angeles, in the county of Los Angeles and State of California, have invented new and useful Improvements in Hose-Couplings, of which the following is a specification.

The primary object of this invention is to provide a hose-coupling which will enable sections of hose to be connected with a minimum of trouble.

A further object of the invention is to provide a hose-coupling wherein the coupled members are of identical connection, so that the connection can be made at either end of any section with either end of any other section. As usually constructed hose-couplings are made in paired members—for example, male and female—so that in making the connection the proper ends of the joined sections must be selected.

Another object of the invention is to provide a coupling which will not require any substantial amount of rotation of the hose, so that the hose can be connected without having to turn around to place a given part or side uppermost.

The accompanying drawings illustrate the invention.

Figure 1 is a side elevation of the coupling members of the hose-coupling. Fig. 2 is a longitudinal section thereof. Fig. 3 is a longitudinal section of one of the coupling-screw rings. Fig. 4 is a perspective of the coupling end of one of the coupling members.

Each coupling member comprises a tubular body 1, having a shank or stem 2 for insertion in the end of the hose, a cylindrical body portion 3, and a head formed by lateral extensions 4 from said body portion and provided with longitudinal extensions or projections 5.

Each of the coupling members may have two of such longitudinal projections or extensions, arranged diametrically opposite each other, and recesses 6 are formed in each of said members to receive the extensions 5 of the other member. Said recesses and projections correspond to one another in width and are parallel-sided—that is to say, their sides extend longitudinally parallel to the axis of the coupling member. The recesses 6 and projections 5 alternate around the respective members, so that when the members are brought together the recesses and projections will interlock. On the cylindrical portion 3 of each cylindrical member is arranged a ring 7, having a tubular or cylindrical portion 8, slidable and rotatable on said body portion, and a screw portion 9, adapted to extend over the outside of the projection 5 aforesaid and to engage screw-threaded portions 14 of said projections.

The threaded portions 9 of the rings 7 are located at the outer ends of said rings close to the bearing-surface at the same end of the ring, so that when the parts are screwed together the lines of outward and inward strain are close together. It is owing to this fact that the rings 7 may be constructed to bear great strain without danger of breaking, the strain on the threads engaging one set of extensions at the outer end of the ring being resisted at a point close to said threads by said outer end of the ring abutting endwise against the other set of extensions.

Each of the coupling members is desirably provided with shouldered means to retain the rings 7 in place, said means consisting, for example, of rings, collars, or flanges 10, shrunk or soldered on the said members in such position as to limit the rearward movement of the rings, while permitting sufficient movement to enable the parts to be drawn together, as hereinafter described. Said rings may be fastened to the tubular member 1 after the clamping-rings 7 are in place.

Suitable gasket or packing means is desirably provided on each of the coupling members consisting of rubber washers or gaskets 11, adapted to rest upon the inner or end face of the coupling member and each having a nipple, tubular extension, or flange 12, engaging in a countersink 13 in the end of the coupling member to retain the gasket in place when the parts are uncoupled.

The coupling is used as follows: Each of the coupling members is secured within the end of a hose-section by insertion of its stem in the hose and binding the same in any usual manner to make a tight joint. The connection can be made between either end of any section and either end of any other section by bringing the coupling members together and slipping the projections of each member into the recesses of the other member and then turning the respective rings 7 so as to screw each ring onto the ends of the projections of the other member, thereby drawing the members together so tightly that a tight joint will be made at the gasket or packing 11. In this operation the rear ends or shoulders of extensions 4 serve as an abutment against which the screw-rings 9 press to draw the coupling members together, the end of each screw-ring serving as a continuous annular bearing-face which operates against the shoulders at the rear end of extensions 4 in all rotative positions of the ring, and the screw portion of the ring being continuous, so as to extend across the recesses 6 and to engage with the screw-threaded portions 14 of the projections 4 in all rotative positions of the ring.

It will be seen that the connection can always be made without rotating the hose more than ninety degrees in either direction, since one or the other of the two lugs can be brought to any given angular position by such partial rotation.

The projections and recesses in each member being parallel-sided and of corresponding width, it therefore follows that when the parts are brought together as above described relative rotation of the accompanying members is prevented as soon as engagement begins between said members and does not depend upon screwing the parts completely home. Coupling members have been devised with projections tapering toward their ends, and in such a device interlocking is incomplete until the parts are screwed all the way up and there will be a close and in some conditions, owing to variation in the thickness of the packing-washers, non-rotative engagement of the members.

Various modifications may be made in the construction of the parts of the coupling without departing from my invention.

What I claim is—

1. In combination, a member for a hose-coupling comprising a hollow, substantially cylindrical body, one end of which is recessed internally around the base and externally longitudinally upon opposite sides and is provided with two shoulders and two oppositely-located forwardly-extending projections, the sides of the projections and of said recesses being straight and parallel with each other and with the axis of the body, the width of the projections being in correspondence with the width of the recesses and the upper surface of the forward end of each projection provided with screw-threads, and a ring adapted to screw upon said projections and abut endwise against said shoulders.

2. A hose-coupling comprising two tubular interlocking members, each having a set of shouldered, longitudinally-projecting externally-threaded extensions, and longitudinal recesses therebetween, each extension of one member fitting in a recess in the opposite member, and internally-screw-threaded rotatable rings on said members, said rings being adapted to screw onto one set of extensions and abut endwise against the other set.

3. A hose-coupling comprising two interlocking members, each having a set of oppositely-located shouldered, longitudinally-projecting extensions and longitudinal recesses therebetween the sides of the extension and recesses being parallel with each other and with the axis of the member, each extension of said member fitting in a recess of the opposite member, and internally-screw-threaded rotatable rings on said members for engaging with said shoulders and extensions respectively, said rings adapted to screw onto one set of extensions and abut endwise against the other set.

4. A hose-coupling comprising two tubular members each having an abutment and screw-threaded interlocking extensions projecting longitudinally therefrom forward of the abutment, a gasket seated in each tubular member, and a ring mounted to turn around each tubular member and engaging with the abutment thereon to limit its longitudinal movement, each ring being internally screw-threaded to engage with the screw-threaded projections on the other member.

5. A hose-coupling comprising two tubular members having each a set of raised, longitudinally-projecting, externally-threaded extensions, and internally-threaded rings adapted to screw onto one set of extensions and abut endwise against the other set.

In testimony whereof I have signed my name to this specification, in the presence of two subscribing witnesses, at Los Angeles, in the county of Los Angeles and State of California, this 3d day of June, 1904.

CLAUDE E. BEWLEY.

In presence of—
ARTHUR P. KNIGHT,
JULIA TOWNSEND.